(12) United States Patent
Drews

(10) Patent No.: US 6,918,036 B1
(45) Date of Patent: Jul. 12, 2005

(54) PROTECTED PLATFORM IDENTITY FOR DIGITAL SIGNING

(75) Inventor: Paul C. Drews, Gaston, OR (US)

(73) Assignee: Intel Corporation, Santa Clara, CA (US)

( * ) Notice: Subject to any disclaimer, the term of this patent is extended or adjusted under 35 U.S.C. 154(b) by 1029 days.

(21) Appl. No.: 09/608,560

(22) Filed: Jun. 30, 2000

(51) Int. Cl.[7] ............................................. H04L 9/32
(52) U.S. Cl. ....................... 713/176; 713/156; 713/157
(58) Field of Search .................................. 713/156, 157, 713/168, 169, 176

(56) References Cited

U.S. PATENT DOCUMENTS 6,038,322 A * 3/2000 Harkins ...................... 380/279
6,122,732 A * 9/2000 Ahuja ........................... 713/1
6,289,459 B1 * 9/2001 Fischer et al. .............. 713/200
6,308,277 B1 * 10/2001 Vaeth et al. ................ 713/201

* cited by examiner

*Primary Examiner*—Justin T. Darrow
(74) *Attorney, Agent, or Firm*—Blakely, Sokoloff, Taylor & Zafman LLP

(57) ABSTRACT

A first storage to store a platform identifier (ID). The platform ID is unique to a platform. A second storage to store an authentication identifier. The authentication identifier is provided by an authentication vendor. The authentication vendor uses the platform ID, a platform private key, and an authentication private key. A signature generator uses the platform ID and the authentication identifier to generate a digital signature.

44 Claims, 8 Drawing Sheets

PROTECTED PLATFORM IDENTITY FOR DIGITAL SIGNING

BACKGROUND

1. Field

This invention relates to microprocessor. In particular, the invention relates to microprocessor cryptography.

2. General Background

Advances in microprocessor and communication technologies have opened up many opportunities for applications that go beyond the traditional ways of doing business. Electronic commerce (E-commerce) and business-to-business (B2B) transactions are now becoming popular, reaching the global markets at a fast rate. Unfortunately, while modern microprocessor systems provide users convenient and efficient methods of doing business, communicating and transacting, they are also vulnerable to unscrupulous attacks. Examples of these attacks include virus, intrusion, security breach, and tampering. Computer security, therefore, is becoming more and more important to protect the integrity of the computer systems and increase the trust of users.

Threats caused by unscrupulous attacks may be in a number of forms such as passive wiretapping (eavesdropping), e.g., interception of messages, usually without detection, and active wiretapping (tampering), e.g., deliberate modification made to the message stream, which threatens authenticity. An invasive remote-launched attack by attackers may disrupt the normal operation of a system connected to thousands or even millions of users. A virus program may corrupt code and/or data of a single-user platform.

Various efforts in the computer industry have been directed at improving security in computer processing environments. These efforts have been focused on various issues concerning data security including privacy, authentication, integrity, and non-repudiation, etc. Security solutions have been developed by various entities and companies in dealing with these basic security issues. In cases where software or other digital content is licensed to be used only on a specific system (e.g., platform) it is common to have the platform sign a unique message supplied by the content provider to "prove" that the platform identity matches the platform identity authorized to use the digital content. In cases where a platform originates a message or data it is common to have the platform sign the message or data to prove that the message or data originated from that platform.

The digital signature in these cases is produced using a private key. Ideally, the private key is kept secretly inside a platform (i.e., first platform) so that unauthorized users (e.g., intruders, attackers, forgers) cannot find out what it is. Unfortunately, signatures can be forged because if the authorized users can write code to use the private key, then the unauthorized users can also write code to read the private key and install it on another platform, allowing that other platform to impersonate the identity of the first platform.

Therefore, there is a need to have a technique to sign data with a high degree of resistance to attack that provides protection against a second platform impersonating a first platform even if the attacker has access to the first platform.

BRIEF DESCRIPTION OF THE DRAWINGS

The features and advantages of the present invention will become apparent from the following detailed description of the present invention in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

In the following description, terminology is used to discuss certain features of the present invention. For example, a "platform" includes hardware equipment and/or software that process information. Examples of a platform include, but are not limited or restricted to a computer (e.g., a desktop, a laptop, a hand-held, a server, a workstation, etc.), desktop office equipment (e.g., printer, scanner, a facsimile machine, etc.), a wireless telephone handset, a television set-top box, and the like. The term "information" is defined as one or more of data, address, and/or control.

With respect to cryptographic functionality, a key is information used by a cryptographic function to perform a particular operation such as encryption or decryption. A "cryptographic function" is a software routine or a collective process for conducting cryptographic operations such as symmetric functions (e.g., Data Encryption Standard "DES"), asymmetric functions (e.g., Rivest, Shamir, and Adleman "RSA" based functions), or a function for digitally signing information (e.g., Digital Signature Algorithm "DSA" or a RSA-based signing functions). A "digital signature" is generally defined as data signal with a private key of the signatory. Normally, a digital signature is used to authenticate or verify data integrity in order to ensure that the data has not been illicitly modified after being digitally signed. The data may be provided in its entirety, or as a hash value produced by a hashing function. In addition, an "authentication vendor" is any person or entity in a position of trust to guarantee or sponsor certain information (e.g., a bank, government entity, trade association, original equipment manufacturer, etc.).

Figure 1A:
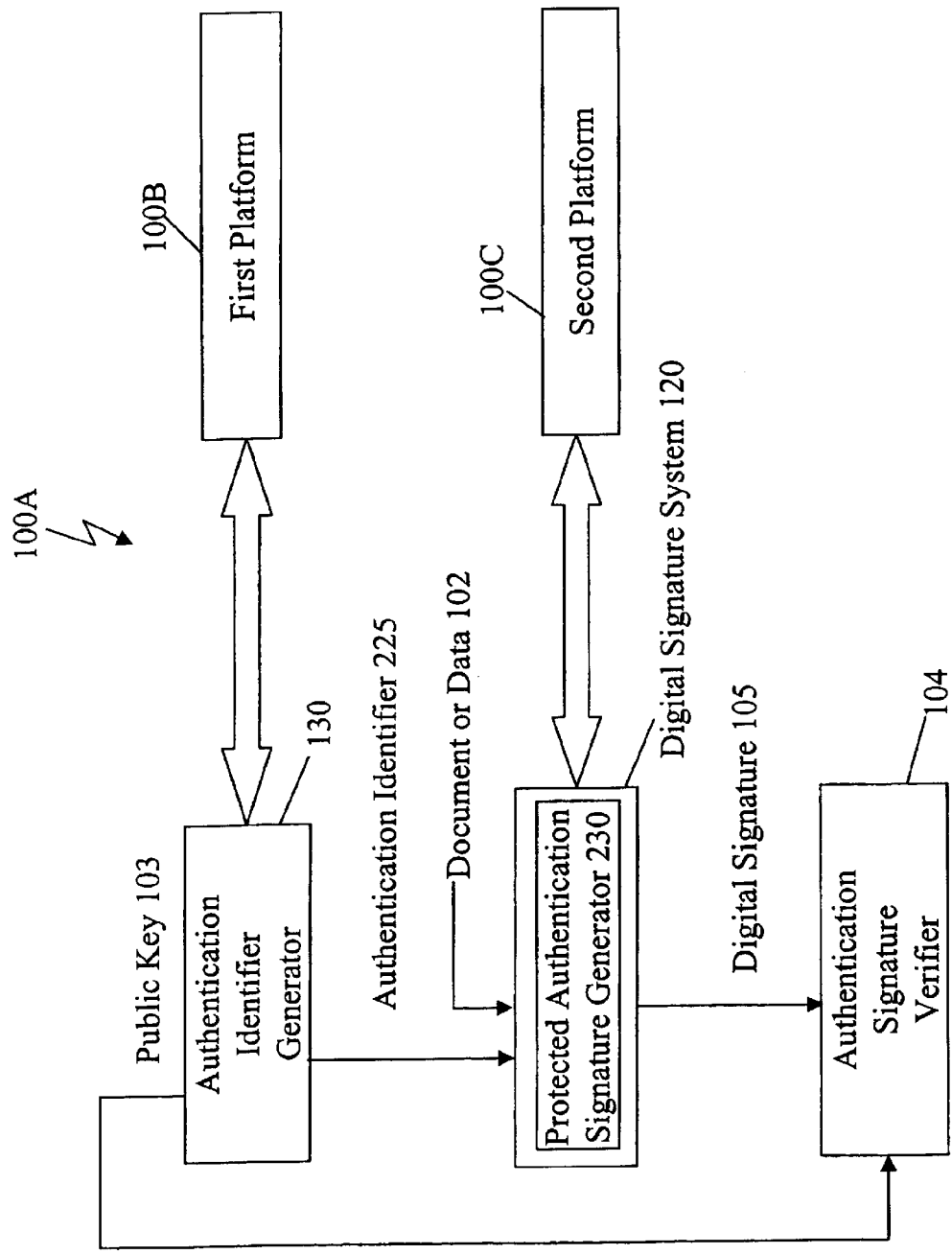
FIG. 1A is a diagram illustrating a block diagram of a protected authentication environment according to one embodiment of the invention

FIG. 1A is a diagram illustrating an authentication system 100A according to one embodiment of the present invention.

The authentication system 100A includes a first platform 100B, a second platform 100C, a digital signature system 120, an authentication identifier generator 130, and an authentication signature verifier 104.

The first platform 100B produces an authentication identifier 225 along with a corresponding public key 103. The public key 103 is a conventional asymmetric public key as is well known in the art. The authentication identifier 225 is similar to a corresponding private key, except that it has been altered so that it can only be used on the specific second platform 100C for generating a digital signature 105.

The second platform 100C is a platform on which the digital signature 105 and data 102 are generated. The second platform 100C is typically used or accessed by a user who desires to generate the digital signature 105 to prove the origin and integrity of data 102. The data 102 may be numbers, a text file, a program, a picture file, an audio file, a media file, an electronic mail (e-mail), a hyper-text markup language (HTML) page, document, etc.

In one common usage, the data 102 is a unique message supplied by a provider of digital content or software licensed only for use on the specific second platform 100C. The second platform 100C generates the digital signature 105 of the supplied data to prove the identity of the platform to a digital content or software provider.

The digital signature 105 can be verified using the authentication signature verifier 104. Verification is performed using the public key 103 according to public-key based digital signature verification techniques that are well known in the art. The verification of the digital signature 105 may be performed inside or outside the second platform 100C.

Figure 4:
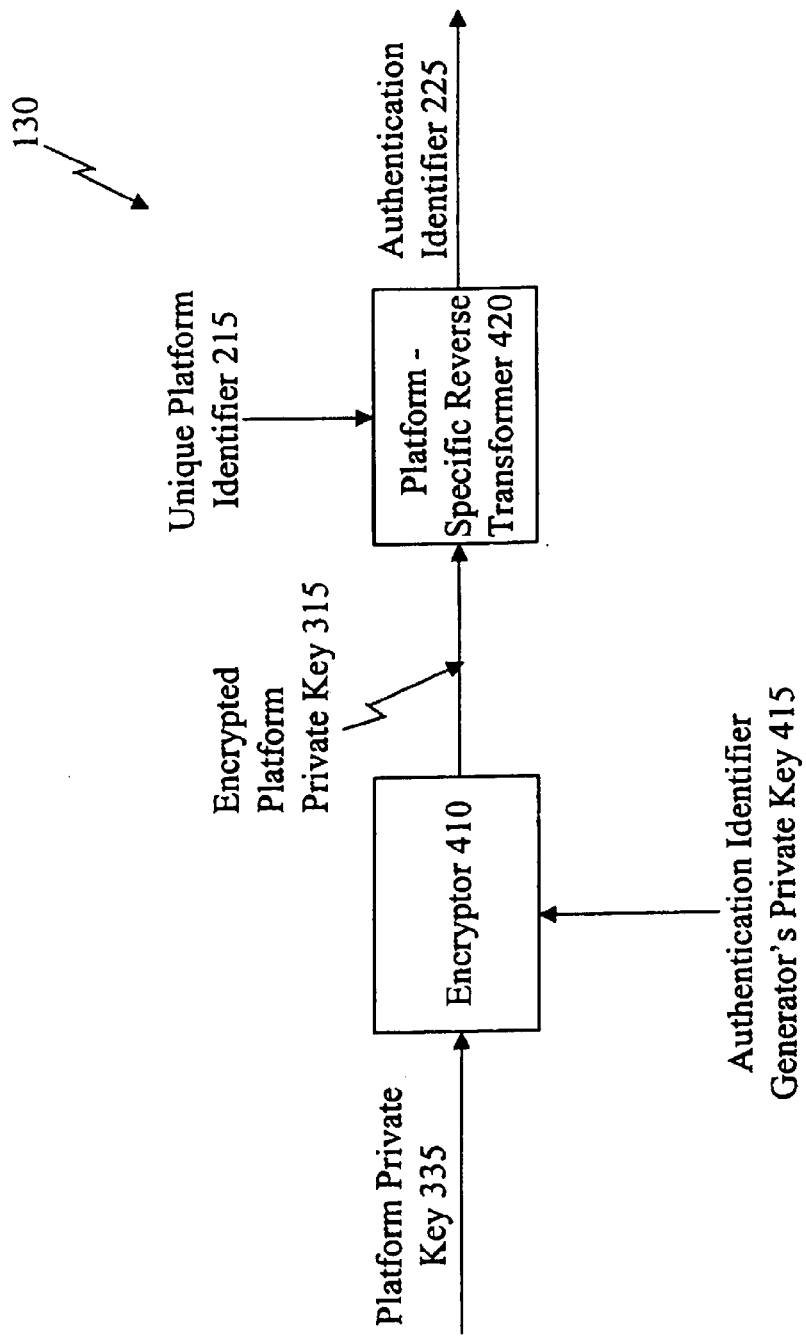
FIG. 4 is a diagram illustrating a block diagram of the authentication identifier generator shown in FIG. 1A according to one embodiment of the invention.

The authentication identifier generator 130 generates both (i) the authentication identifier 225 to be used by the protected authentication signature generator 230 and (ii) a corresponding public key 103 to be used by the authentication signature verifier 104. The authentication identifier generator 130 is external to the second platform 100C and is provided by an authentication vendor. The generation of the authentication identifier 225 is shown in FIG. 4. The second platform 100C receives the authentication identifier 225 and uses the digital signature system 120 to generate the digital signature 105. The digital signature system 120 may be implemented inside or outside of the second platform 100C.

The authentication identifier generator 130 and the protected authentication signature generator 230 may be implemented by hardware, software, or any combination thereof.

Figure 1B:
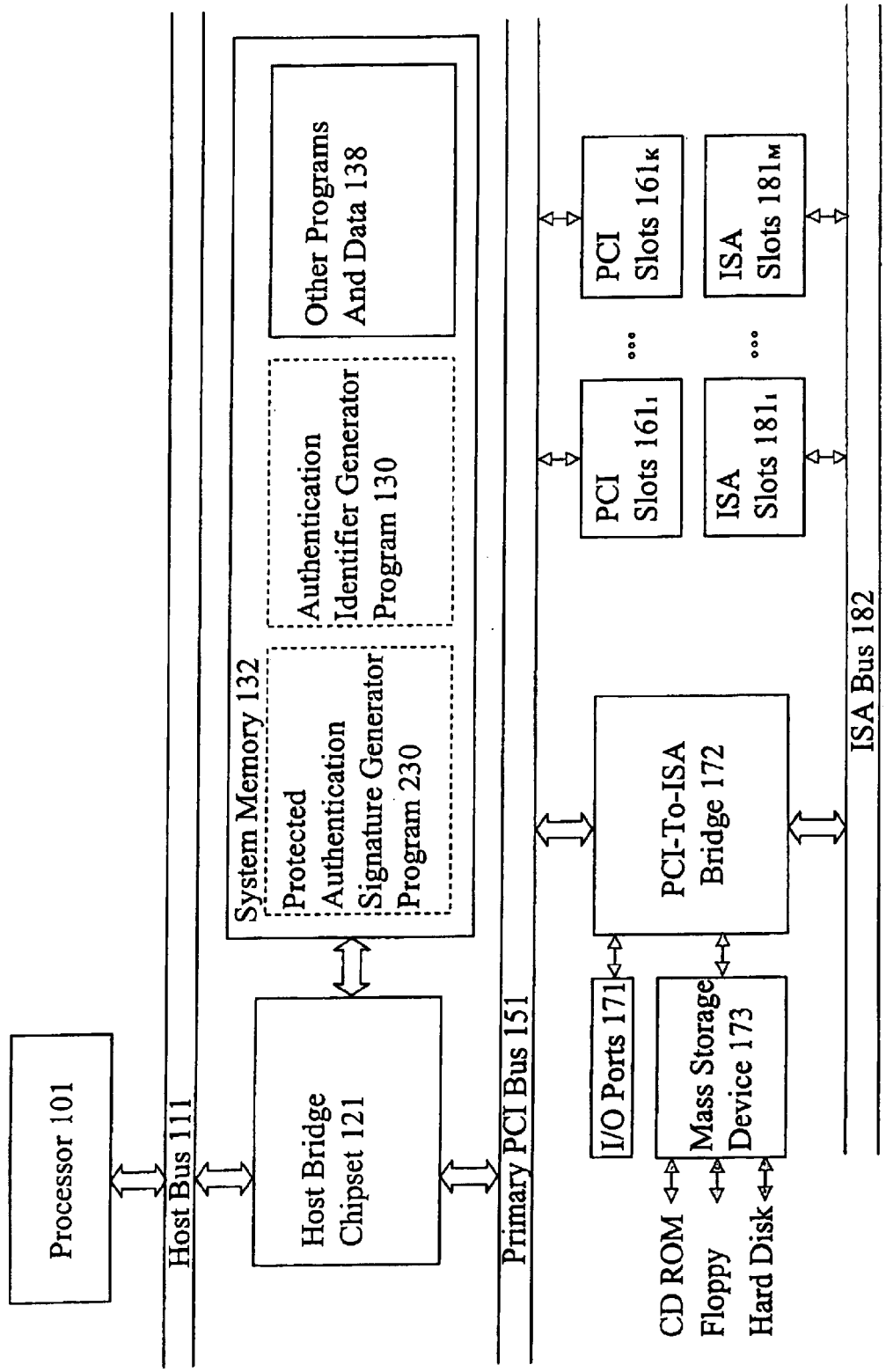
FIG. 1B is a diagram illustrating a platform in which one embodiment of the invention can be practiced.

FIG. 1B is a diagram illustrating a platform in which one embodiment of the present invention can be practiced. The first platform 100B or the second platform 100C includes a processor 101, a host bus 111, a host bridge chipset 121, a system memory 132, a primary peripheral component interconnect (PCI) bus 151, PCI slots $161_1$ to $161_K$ ($"K" \geq 2$), a PCI-to-industry standard architecture (ISA) bridge 172, mass storage device 173, Input/Output (I/O) ports 171, an ISA bus 182, and ISA slots $181_1$ to $181_M$ ($"M" \geq 2$).

The processor 101 represents a processing unit of any type of architecture. For example, the processor 101 may be implemented as a microcontroller, a digital signal processor, a state machine, or a central processing unit (CPU). The CPU may be implemented with a variety of architecture types such as complex instruction set computers (CISC), reduced instruction set computers (RISC), very long instruction word (VLIW), or hybrid architecture.

The host bridge chipset 121 includes a number of interface circuits to allow the processor 101 access to the system memory 132 and the primary PCI bus 151. The system memory 132 represents one or more mechanisms for storing information. For example, the system memory 132 may include non-volatile or volatile memories. Examples of these memories include flash memory, read only memory (ROM), or random access memory (RAM). In the platform 100B, the system memory 132 may contain a program that can implement the authentication identifier generator 130 and other programs or data. In the platform 100C, the system memory may contain a program that can implement a protected authentication signature generator program 230 and other programs and data. The program in the platform may be software program or firmware program. Of course, the system memory 132 preferably contains additional software (not shown), which is not necessary to understanding the invention. The PCI slots $161_1$ to $161_K$ provide interfaces to PCI devices. Examples of PCI devices include the network interface and the media interface. The network interface connects to communication channel such as the Internet. The Internet provides access to on-line service providers, Web browsers, and other network channels. The media interface provides access to audio and video devices. The PCI-to-ISA bridge 172 provides access to the ISA bus 182, mass storage devices 173, and input/output (I/O) ports 171. The I/O ports 171 provides interface to I/O devices (not shown). The I/O devices may include any I/O devices to perform I/O functions such as a media card (e.g., audio, video, graphics), a network card and the like. The mass storage device 173 includes a machine readable media such as a compact disk (CD) ROM, a digital video disk (DVD), ZIP™ disk, floppy diskette, hard drive, and the like. The mass storage device 173 stores archive information such as code, programs, files, and operating systems. The mass storage device 173 provides a mechanism to read the machine-readable media.

When implemented in software, the elements of the present invention are the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable programmable ROM (EPROM), a floppy diskette, a CD-ROM, an optical disk, a hard disk, a fiber optical medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, an Intranet, etc. The ISA bus 182 has a number of ISA slots $181_1$ to $181_M$ to interface to ISA devices. Examples of ISA devices include data entry devices (e.g., keyboard, mouse, trackball, pointing device), printers, etc.

Figure 2:
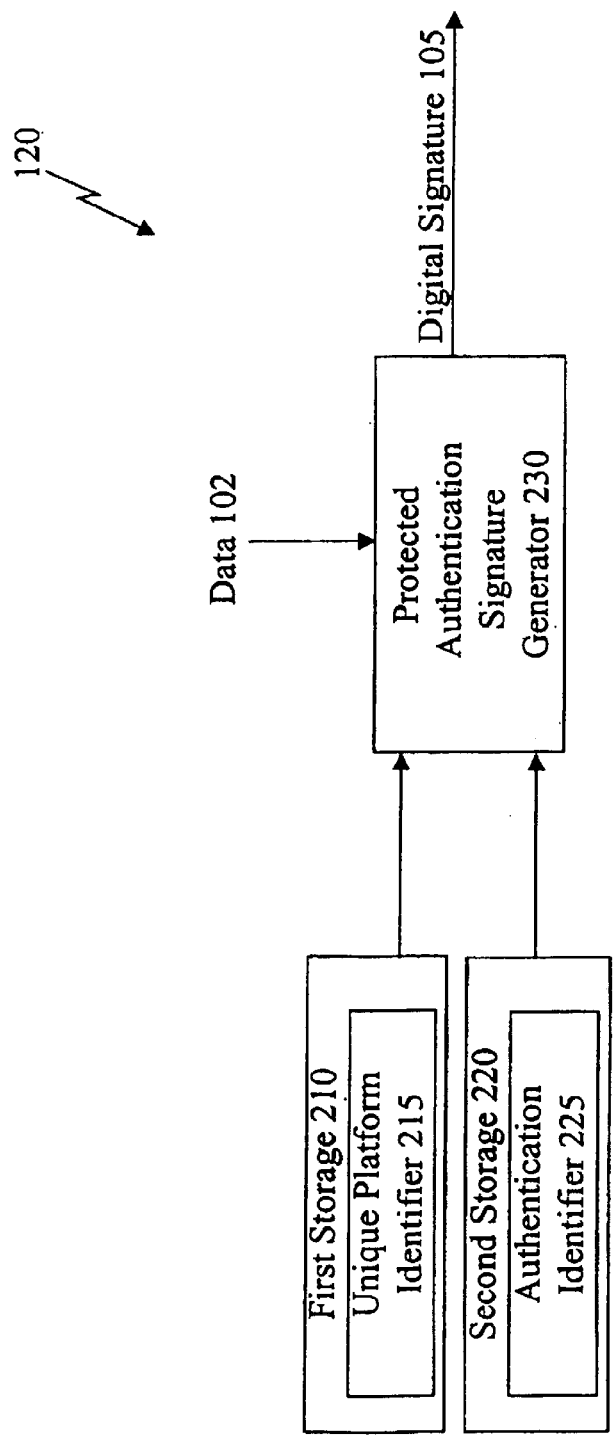
FIG. 2 is a diagram illustrating a block diagram of the digital signature system shown in FIG. 1A according to one embodiment of the invention.

The protected authentication signature generator 230 may be stored in ROM to guard against attacks that forge a digital signature of a different platform. The protected authentication signature generator 230 may be retrieved from a processor readable medium or transmission medium. In this case, it is common to use a digital signature of the program or code segments to guard against alteration attacks. Such digital signature techniques are well known in the art. FIG. 2 is a diagram illustrating a block diagram of the digital signature system 120 according to one embodiment of the invention. The digital signature system 120 includes a first storage 210, a second storage 220, and a protected authentication signature generator 230. The protected authentication signature generator 230 signs the data 102 to generate digital signature 105 using the unique platform identifier 215 and the authentication identifier 225.

The first storage 210 guards against the unique platform identifier 215 being easily altered. In one embodiment, the unique platform identifier 215 is a platform identifier (ID) "Universal Unique Identifier" (UUID) or "Globally Unique Identifier" (GUID) retrieved from a System Management Basic Input/Output System (SMBIOS) table. Techniques for generating such unique identifiers, storing them in an SMBIOS table, and guarding them against alteration are well known in the industry.

In another embodiment, the unique platform identifier 215 is a unique processor serial number retrieved using a special processor instruction. The processor guards against its internal serial number being altered. Any digital platform identifier can be used as long as it is unique and guarded against alteration.

The second storage 220 stores the authentication identifier 225. Unique to the second platform 100C, the authentication identifier 225 is provided by the authentication vendor and is installed to the platform 100C (shown in FIG. 4). Since the authentication identifier 225 may be dynamically installed in the platform 100C after the platform is manufactured, it is likely that the second storage 220 is not guarded or cannot be guarded against being altered. However, the present invention protects against the authentication identifier 225 being used to generate any valid digital signatures if it has been altered.

The protected authentication signature generator 230 is used to prove the originator (e.g., platform) and integrity of a message. The protected authentication signature generator 230 represents a black box or a function that is transparent to the users. The origination and integrity proof is created when a user from the platform 100C performs the signing function via the protected authentication signature generator 230 that is unique to the platform 100C. This signing function produces the digital signature 105.

Referring back to FIG. 1A, the authentication signature verifier 104 completes the authentication cycle by verifying that data is unaltered compared to the data from which the digital signature is computed and that the digital signature 105 is generated by the correct platform 100C. The authentication signature verifier 104 takes as input the data 102, the digital signature 105, and the public key 103. The authentication signature verifier 104 generates as output an information bit signifying whether or not the data matches the original data and the digital signature is generated using the corresponding private key.

In one embodiment, the digital signature 105 and the data 102 are collected into a single "signed data" message. The data 102 and the digital signature 105 may have any type of format and may or may not be collected into a single message.

Figure 3:
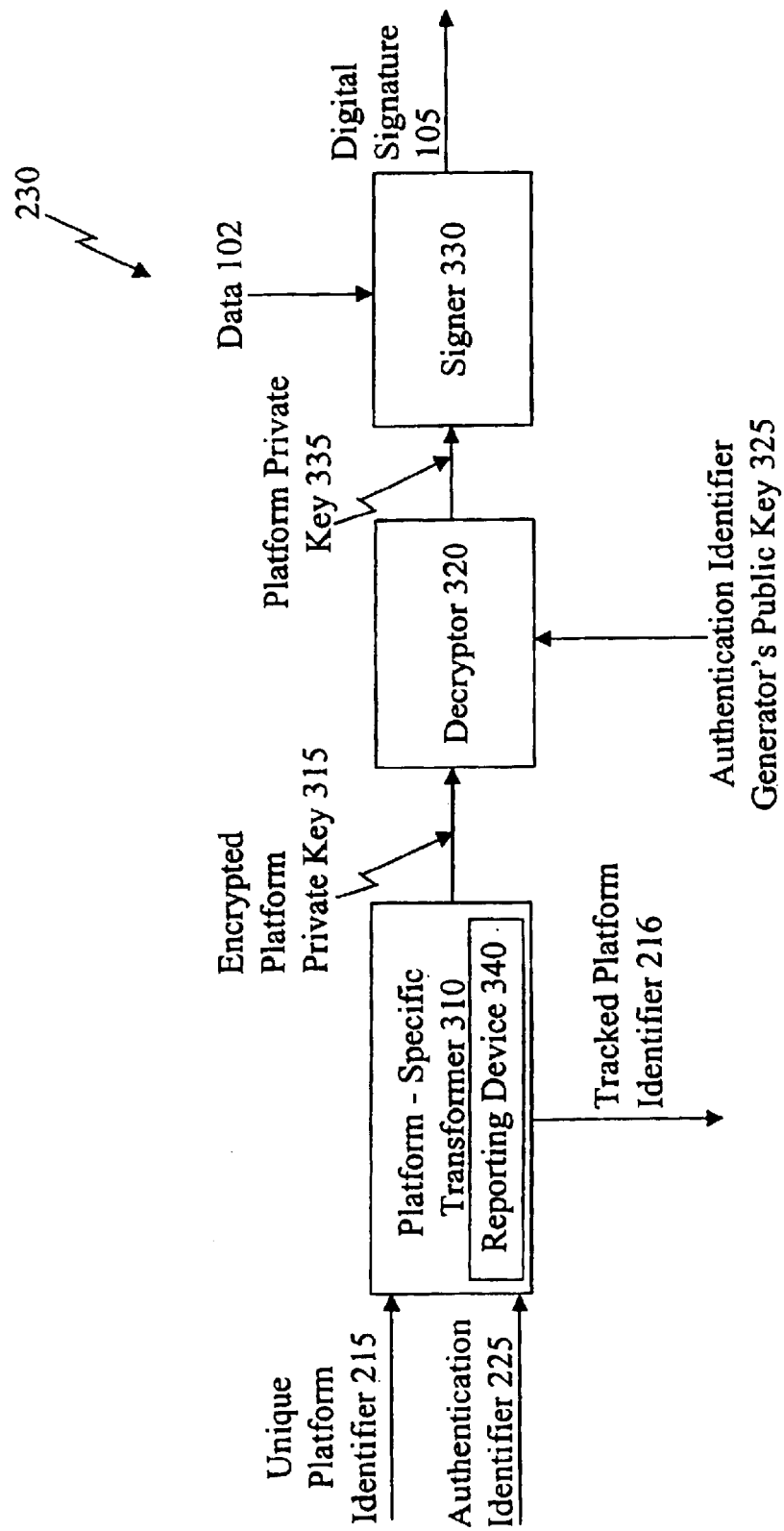
FIG. 3 is a diagram illustrating a block diagram of the protected authentication digital generator shown in FIG. 2 according to one embodiment of the invention.

FIG. 3 is a diagram illustrating the protected authentication signature generator 230 shown in FIG. 2 according to one embodiment of the invention. The protected authentication signature generator 230 includes a platform-specific transformer 310, a decryptor 320, and a signer 330.

The platform-specific transformer 310 performs a platform-specific transformation of the authentication identifier 225 to output an encrypted platform private key 315. The transformation uses the unique platform identifier 215 to make the transformation unique to the platform. The platform-specific transformation is reversible in the sense that the opposite transformation from the encrypted platform private key 315 to the authentication identifier 225 can be readily done given the same unique platform identifier 215. Any of a variety of different embodiments of the platform-specific transformer 310 can be used as long as they have the required properties of being reversible and being specific to the unique platform identifier 215.

For example, the platform-specific transformer 310 may be an Exclusive OR (XOR) device that performs a bit-wise XOR of two input streams of bits to produce an output stream of bits. One of the input bit streams is the authentication identifier 225. The other input bit stream is a unique, serially uncorrelated bit stream generated in a reproducible way from the unique platform identifier 215. In one embodiment of the serially uncorrelated bit stream, a cryptographic hash of the unique platform identifier 215 is computed to generate the first run of bits. As long as more bits are needed, the previous run of bits is hashed to produce the next run of bits.

In another embodiment of the platform-specific transformer 310, the unique platform identifier 215 is used as a seed to generate a symmetric encryption/decryption key, and the transformation is a decryption using this symmetric key. Techniques for generation of symmetric keys and symmetric key decryption from the unique platform identifier 215 are well known in the art.

The platform-specific transformer 310 further includes a reporting device 340 to report the unique platform identifier 215 that is used in the transformation. The reporting device 340 generates an additional output from the protected authentication signature generator 230. The additional output is referred to as the "tracked platform identifier" 216, which may be simply a copy of the unique platform identifier 215. For example, this may be used to detect attacks based on forging or altering the platform's unique platform identifier 215. If the same tracked platform identifier 216 is detected from several different platforms, a forgery may be detected.

The decryptor 320 decrypts the encrypted platform private key 315 to generate a "clear" copy of the platform private key 335. The decryption is an asymmetric decryption performed using an authentication identifier generator's public key 325 embedded in the protected authentication signature generator 230. The authentication identifier generator's pubic key 325 is provided to the platform 100C by the vendor of the authentication identifier 225 (e.g., authentication vendor). The authentication identifier generator's public key 325 is a "public" key of the asymmetric encryption public/private key pair used by the authentication vendor.

The inclusion of the decryptor 320 in the protected authentication signature generator 230 provides protection against attacks based on reverse-engineering the protected authentication signature generator 230. Without the decryptor 320, a skilled attacker could use the reverse of the transformation by the platform-specific transformer 310 transformation to compute and then install the authentication identifier 225 that would be suitably transformed into a desired platform private key 335. With the decryptor 320 present, the attacker would have to break the encryption algorithm or the private key corresponding to the authentication identifier generator's public key 325. Since the security of an algorithm rests in the key, it is important that the authentication identifier generator's public key 325 and its corresponding private key be generated using a strong cryptographic process.

The protected authentication signature generator 230 may be exposed to reverse-engineering. In this case, security of the invention depends on how resistant the protected authentication signature generator 230 and the unique platform identifier 215 are to duplication and modification. In other cases, the protected authentication signature generator 230 is protected against reverse-engineering. In these cases the authentication identifier generators public key 325 and the platform private key 335 are secret. This provides protection against an attacker being able to build an alternate device or software module that can produce equivalent signatures.

The signer 330 generates a digital signature 105 of the data 102 using the platform private key 335. The platform private key 335 is the "private" member of an asymmetric public/private key pair to be used for generation and verification of digital signatures using any of a variety of algorithms. Example algorithms include ElGama, Schnorr and Digital Signature Algorithms schemes just to name a few. However, it is not required that these keys also be usable for bulk data encryption and decryption.

The unique platform identifier 215 is a permanent identifier, and may be generated and stored at the time of manufacturing or the initial system boot of the platform 100C. For example, the unique platform identifier 215 may be programmed into fuses of a system ROM. The authentication identifier 225 is provided by the authentication vendor and may be stored at the time of manufacturing or an initial first system boot. However, the present invention allows the authentication identifier 225 to be stored later in the lifetime of the system, and possibly altered if desired. In general, this means that the authentication identifier 225 will be stored in a place where someone could read it and copy it to another platform. However, the copied authentication identifier 225 will not be usable on another platform other than the platform 100C. The platform-specific transformer 310 on the another platform transforms the copied authentication identifier 225 to a different encrypted platform private key 315, the decryptor 320 decrypts it to an invalid platform private key 335, and the signer 330 will either generate an incorrect digital signature 105 or refuse to perform the operation at all depending on its design.

FIG. 4 is a diagram illustrating the authentication identifier generator 130 shown in FIG. 1A according to one embodiment of the invention. The authentication identifier generator 130 includes an encryptor 410 and a platform-specific reverse transformer 420.

The platform private key 335 and the corresponding platform public key 103 may be generated by the user (e.g., purchaser) and the platform private key 335 is then supplied to the authentication vendor. The platform private key 335 and the corresponding platform public key 103 may also be generated by the authentication vendor and the platform public key 103 is then supplied to the user.

The encryptor 410 encrypts the platform private key 335 to generate an encrypted platform private key 315 using an authentication identifier generator's private key 415 owned by the authentication vendor. The encryptor 410 performs the reverse of the decryption performed by the decryptor 320 shown in FIG. 3. When the protected authentication signature generator is exposed to reverse-engineering, the encryptor 410 and decryptor 320 use asymmetrical encryption and decryption. Symmetrical encryption and decryption may be used if there is no risk that either the encryptor 410 or decryptor 320 may be reverse-engineered.

The platform-specific reverse transformer 420 transforms the encrypted private key 315 to generate the authentication identifier 225. The platform-specific reverse transformer 420 uses the unique platform identifier 215 to make its transformation platform-specific. The platform-specific reverse transformer 420 performs the exact reverse of the transformation performed by the platform-specific transformer 310 shown in FIG. 3.

Any of a variety of embodiments of the platform-specific reverse transformer 420 can be used as long as the embodiment used is the reverse of the platform-specific transformer 310. If the XOR embodiment of the platform-specific transformer 310 is used, the identical algorithm can be used for the platform-specific reverse transformer 420. The platform-specific transformer 310 that uses symmetric-key decryption may need to use an encryption variation of the algorithm for the platform-specific reverse transformer 420.

Figure 5:
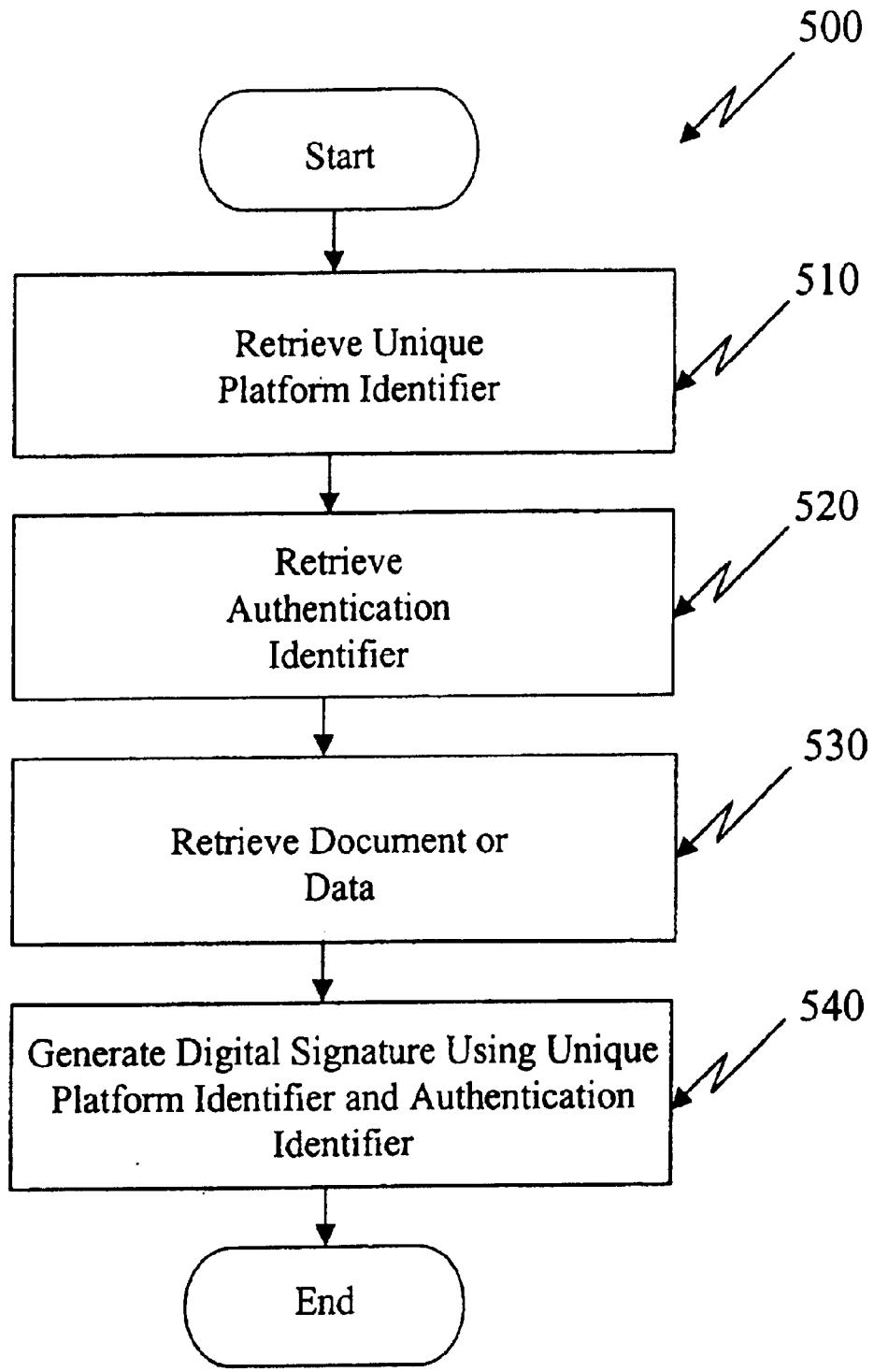
FIG. 5 is a flowchart illustrating a process to generate a digital signature according to one embodiment of the invention.

FIG. 5 is the flowchart illustrating a process 500 to generate a signed data according to one embodiment of the invention.

Upon START, the process 500 retrieves the unique platform identifier from the first storage (Block 510). Then the process 500 retrieves the authentication identifier from the second storage (Block 520). Next, the process 500 receives data that needs to be signed by the platform (Block 530). The process 500 generates a digital signature using the unique platform identifier and the authentication identifier (Block 540). The signed data is a digital code that is the output result of the process 500. Then the process 500 is terminated.

Figure 6:
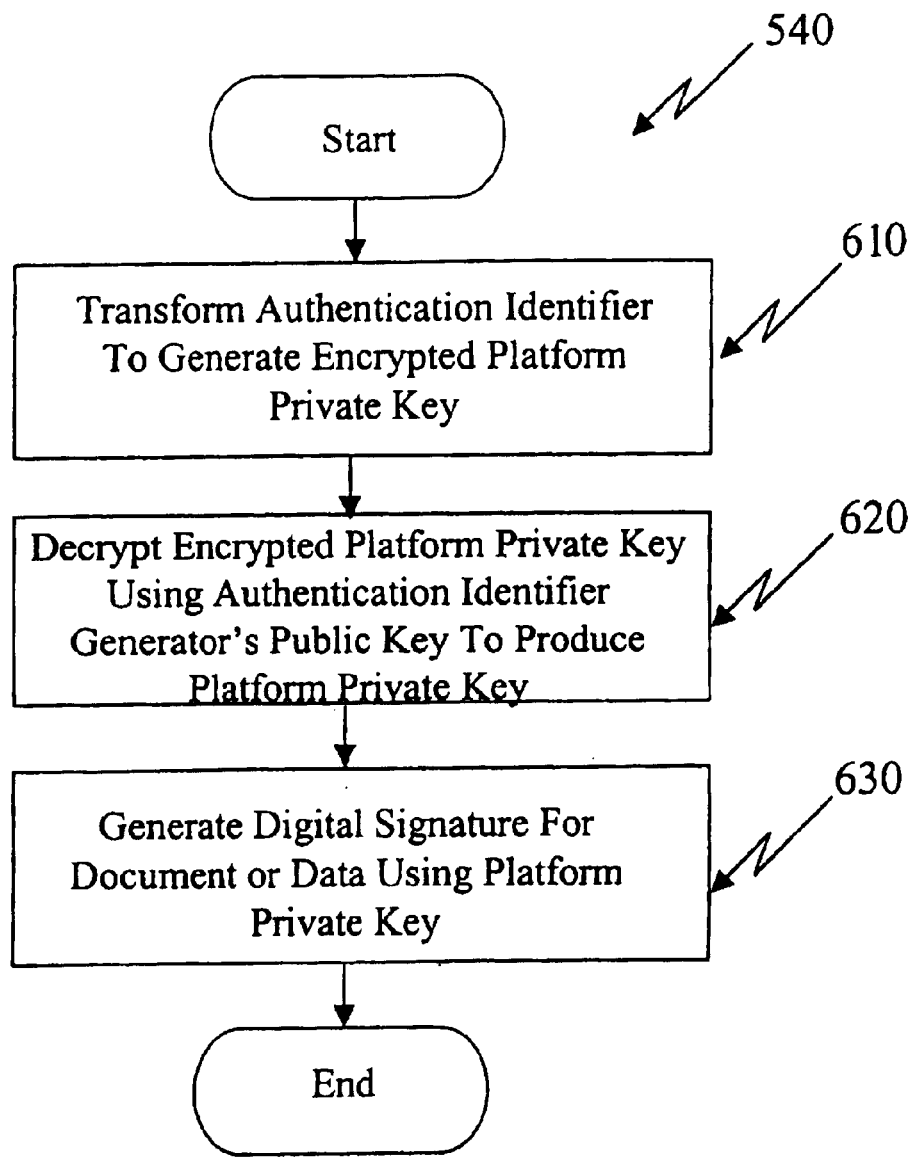
FIG. 6 is a flowchart illustrating the process shown in Block 540 of FIG. 5 according to one embodiment of the invention.

FIG. 6 is a flowchart illustrating the process generating the digital signature of process 500 according to one embodiment of the invention.

Upon START, the process 540 transforms the authentication identifier and the platform identifier to generate an encrypted platform private key (Block 610). The transformation is a reversible transformation that uses the unique platform identifier to make the transformation platform-specific. Next, the process 540 decrypts the encrypted platform private key using the using an authentication identifier generator's public key, producing a platform private key (Block 620). Then, the process 540 generates a digital signature for the data using the platform private key (Block 630) according to digital signature generation algorithms. Then the process 540 is terminated.

Figure 7:
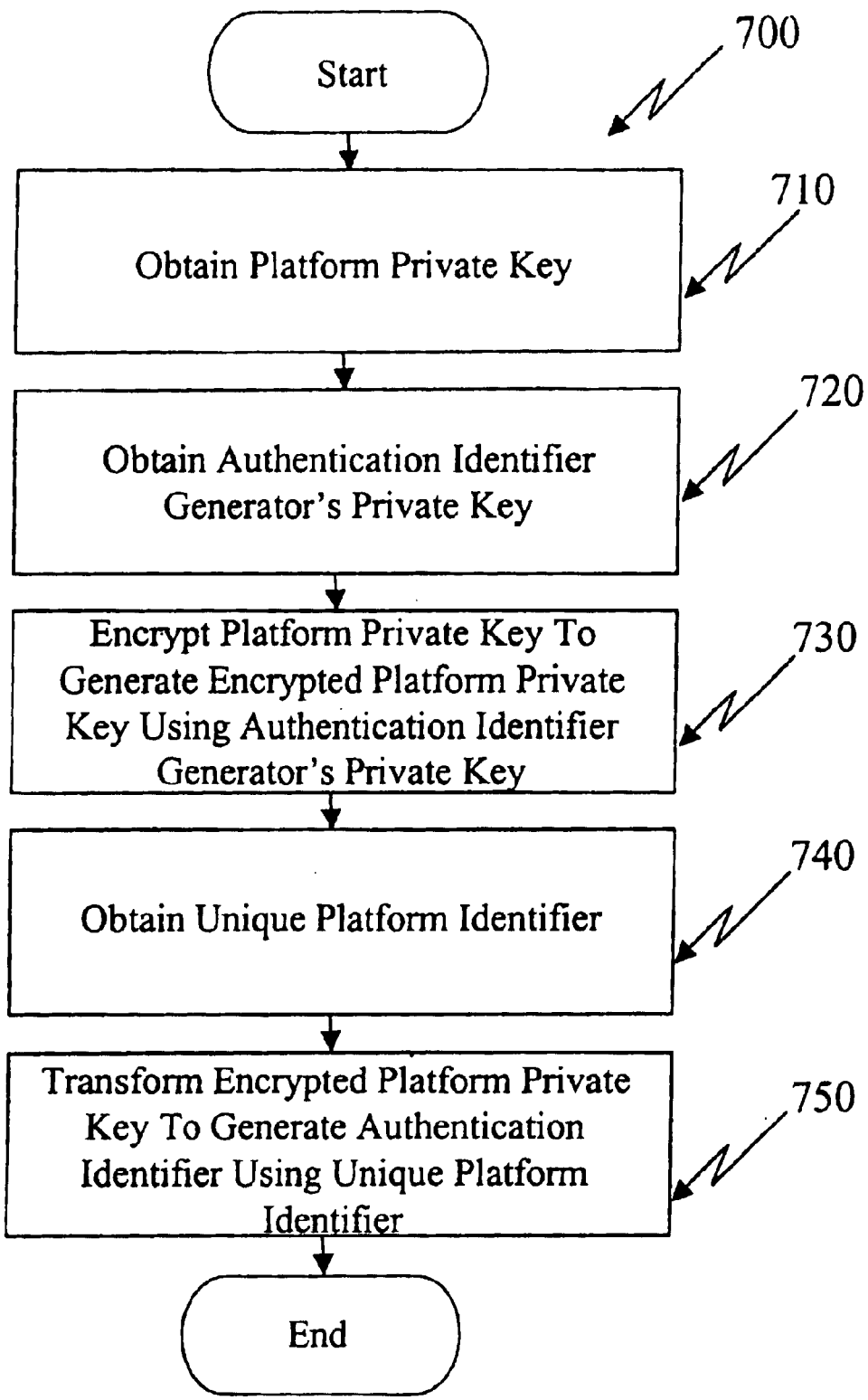
FIG. 7 is a flowchart illustrating a process to generate an authentication identifier according to one embodiment of the invention.

FIG. 7 is a flowchart illustrating a process 700 to generate an authentication identifier according to one embodiment of the invention.

Upon START, the process 700 obtains a platform private key (Block 710). Then, the process 700 obtains an authentication identifier generator's private key (Block 720). Next, the process 700 encrypts the platform private to generate an encrypted platform private key using the authentication identifier generator's private key (Block 730). The process 700 obtains a unique platform identifier from the platform (Block 740). Then the process 700 transforms the encrypted platform private key to generate an authentication identifier (Block 750). The transformation is made platform-specific by the use of the unique platform identifier, and is the reverse of the transformation of Block 610. Then the process 700 is terminated.

While this invention has been described with reference to illustrative embodiment, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a first storage to store a platform identifier unique to a platform;
   a second storage to store an authentication identifier, the authentication identifier being provided by an authentication vendor using the platform identifier, a platform private key, and an authentication private key; and
   a signature generator to generate a digital signature for data using the platform identifier and the authentication identifier, the signature generator comprises
      a platform-specific transformer to transform the authentication identifier using the platform identifier to output an encrypted platform private key, the platform specific transformer comprises a reporting device to report the platform identifier to generate a tracked platform identifier, and
      a decryptor coupled to the platform-specific transformer to decrypt the encrypted platform private key to generate the platform private key using an authentication public key, the authentication public key being provided by the authentication vendor.

2. The apparatus of claim 1 wherein the signature generator further comprises:
   a signer coupled to the decryptor to sign the data using the platform private key, the platform private key being transparent to the platform.

3. The apparatus of claim 1 wherein the platform-specific transformer comprises:
   an Exclusive OR (XOR) device to perform an XOR function on the platform identifier and the authentication identifier.

4. The apparatus of claim 1 wherein the platform-specific transformer comprises:
   a decryptor to decrypt the authentication identifier using a symmetric encryption/decryption key generated from the platform identifier.

5. The apparatus of claim 1 wherein the authentication identifier is generated by a platform-specific reverse transforms which transforms the encrypted platform private key using the platform identifier, the encrypted platform private key being encrypted from the platform private key using the authentication private key.

6. The apparatus of claim 5 wherein the platform-specific reverse transformer comprises an Exclusive OR (XOR) device to perform an XOR function on the encrypted platform private key using the platform identifier.

7. The apparatus of claim 3 wherein the platform identifier is a unique, serially uncorrelated bit stream.

8. The apparatus of claim 5 wherein the platform-specific reverse transformer comprises an encryptor to encrypt the encrypted platform private key using a symmetric encryption/decryption key generated from the platform identifier.

9. The apparatus of claim 1 wherein the platform identifier is installed in the first storage in a protected environment.

10. The apparatus of claim 9 wherein the protected environment is a system management basic input/output system table.

11. The apparatus of claim 1 wherein the platform identifier is a processor serial number retrieved from a processor.

12. A method comprising:
    storing a platform identifier unique to a platform and an authentication identifier in first and second storages, respectively, the authentication identifier being provided by an authentication vendor using the platform identifier, a platform private key, and an authentication private key; and
    generating a digital signature for data using the platform identifier and the authentication identifier by
        transforming the authentication identifier using the platform identifier to output an encrypted platform private key, said transforming of the authentication identifier further comprises reporting the platform identifier to report a tracked platform identifier, and
        decrypting the encrypted platform private key to generate the platform private key using an authentication public key provided by the authentication vendor.

13. The method of claim 12 wherein generating the digital signature further comprises:
    signing the data using the platform private key, the platform private key being transparent to the platform.

14. The method of claim 12 wherein transforming the authentication identifier comprises:
    performing an Exclusive OR (XOR) function on the platform identifier and the authentication identifier.

15. The method of claim 12 wherein transforming the authentication identifier comprises:
    decrypting the authentication identifier using a symmetric encryption/decryption key generated from the platform identifier.

16. The method of claim 12 wherein the authentication identifier is generated by transforming the encrypted private key using the platform identifier, the encrypted private key being encrypted from the platform private key using an authentication private key.

17. The method of claim 16 wherein transforming the encrypted private key using the platform identifier comprises performing an XOR function on the encrypted platform private key and the platform identifier.

18. The method of claim 14 wherein the platform identifier is a unique, serially uncorrelated bit stream.

19. The method of claim 16 wherein transforming the encrypted private key comprises encrypting the encrypted private key using a symmetric encryption/decryption key generated from the platform identifier.

20. The method of claim 12 wherein storing the platform identifier comprises installing the platform identifier in a protected environment.

21. The method of claim 20 wherein the protected environment is a system management basic input/output system table.

22. A computer program product comprising:
    a machine readable medium having computer program code therein, the computer program product comprising:
    computer readable program code for storing a platform identifier unique to a platform and an authentication identifier in first and second storages, respectively, the authentication identifier being provided by an authentication vendor using the platform identifier, a platform private key, and an authentication private key; and
    computer readable program code for generating a digital signature for data using the platform identifier and the authentication identifier, the computer readable program code for generating digital signature comprises:
        computer readable program code for transforming the authentication identifier using the platform identifier to output an encrypted platform private key, the computer readable program code for transforming the authentication identifier further comprises computer readable program code for reporting the platform identifier to generate a tracked platform identifier, and computer readable code for decrypting the encrypted platform private key to generate the platform private key using an authentication public key provided by the authentication vendor.

23. The computer program product of claim 22 wherein the computer readable program code for generating the digital signature further comprises:

computer readable program code for signing the data using the platform private key, the platform private key being transparent to the platform.

24. The computer program product of claim 22 wherein a computer readable program code for transforming the authentication identifier comprises:

computer readable program code for performing an Exclusive OR (XOR) function on the platform identifier and the authentication identifier.

25. The computer program product of claim 22 wherein a computer readable program code for transforming the authentication identifier comprises:

computer readable program code for decrypting the authentication identifier using a symmetric encryption/decryption key generated from the platform identifier.

26. The computer program product of claim 22 wherein the authentication identifier is generated by a computer readable program code for transforming the encrypted private key using the platform identifier, the encrypted private key being encrypted from the platform private key using an authentication private key.

27. The computer program product of claim 26 wherein a computer readable program code for transforming the encrypted private key and the platform identifier comprises performing an XOR function on the encrypted platform private key and the platform identifier.

28. The computer program product of claim 22 wherein the platform identifier is a unique, serially uncorrelated bit stream.

29. The computer program product of claim 26 wherein a computer readable program code for transforming the encrypted private key comprises a computer readable program code for encrypting the encrypted private key using a symmetric encryption/decryption key generated from the platform identifier.

30. The computer program product of claim 22 wherein the computer readable program code for storing the platform identifier comprises computer readable program code for installing the platform identifier in a protected environment.

31. The computer program product of claim 30 wherein the protected environment is a system management basic input/output system table.

32. The computer program product of claim 24 wherein a computer readable program code for transforming the authentication identifier further comprises:

computer readable program code for reporting the platform identifier to generate a tracked platform identifier.

33. The computer program product of claim 22 wherein the platform identifier is a processor serial number retrieved from a processor.

34. A system comprising:

a platform having a unique platform identifier (ID); and a digital signature system coupled to the platform to authenticate data, the digital signature system comprising;

a first storage to store the platform identifier, a second storage to store an authentication identifier, the authentication identifier being provided by an authentication vendor using the platform identifier, a platform private key, and an authentication private key, and a signature generator to generate a digital signature for data using the platform identifier and the authentication identifier, the signature generator comprises a platform-specific transformer to transform the authentication identifier using the platform identifier to output an encrypted platform private key, the platform-specific transformer comprises a reporting device to report the platform identifier to generate a tracked platform identifier, and a decryptor coupled to the platform-specific transformer to decrypt the encrypted platform private key to generate the platform private key using an authentication public key, the authentication public key being provided by the authentication vendor.

35. The system of claim 34 wherein the signature generator further comprises:

a signer coupled to the decryptor to sign the data using the platform private key, the platform private key being transparent to the platform.

36. The system of claim 34 wherein the platform-specific transformer comprises:

an Exclusive OR (XOR) device to perform an XOR function on the platform identifier and the authentication identifier.

37. The system of claim 34 wherein the platform-specific transformer comprises:

a decryptor to decrypt the authentication identifier using a symmetric encryption/decryption key generated from the platform identifier.

38. The system of claim 34 wherein the authentication identifier is generated by a platform-specific reverse transformer which transforms the encrypted platform private key and the platform identifier, the encrypted platform private key being encrypted from the platform private key using the authentication private key.

39. The system of claim 38 wherein the platform-specific reverse transformer comprises an Exclusive OR (XOR) device to perform an XOR function on the encrypted platform private key and the platform identifier.

40. The system of claim 36 wherein the platform identifier is a unique, serially uncorrelated bit stream.

41. The system of claim 38 wherein the platform-specific reverse transformer comprises an encryptor to encrypt the encrypted platform private key using a symmetric encryption/decryption key generated from the platform identifier.

42. The system of claim 34 wherein the platform identifier is installed in the first storage in a protected environment.

43. The system of claim 42 wherein the protected environment is a system management basic input/output system table.

44. The system of claim 34 wherein the platform identifier is a processor serial number retrieved from a processor.

* * * * *